(12) United States Patent
de Bonet et al.

(10) Patent No.: US 7,299,472 B2
(45) Date of Patent: Nov. 20, 2007

(54) SYSTEM AND METHOD FOR DYNAMICALLY DETERMINING NOTIFICATION BEHAVIOR OF A MONITORING SYSTEM IN A NETWORK ENVIRONMENT

(75) Inventors: Jeremy S. de Bonet, North Andover, MA (US); Todd A. Stiers, Berkeley, CA (US); Jeffrey R. Annison, Clayton, CA (US)

(73) Assignee: MobiTV, Inc., Emeryvile, CA (US)

( * ) Notice: Subject to any disclaimer, the term of this patent is extended or adjusted under 35 U.S.C. 154(b) by 739 days.

(21) Appl. No.: 10/345,050

(22) Filed: Jan. 15, 2003

(65) Prior Publication Data

US 2003/0167353 A1  Sep. 4, 2003

Related U.S. Application Data

(60) Provisional application No. 60/349,424, filed on Jan. 18, 2002, provisional application No. 60/349,344, filed on Jan. 18, 2002, provisional application No. 60/348,692, filed on Jan. 15, 2002.

(51) Int. Cl.
G06F 3/00 (2006.01)
(52) U.S. Cl. ....................................... 719/310
(58) Field of Classification Search ................ 719/318, 719/310; 709/224
See application file for complete search history.

(56) References Cited

U.S. PATENT DOCUMENTS

| 5,388,189 A | 2/1995 | Kung |
| 5,497,434 A | 3/1996 | Wilson |
| 5,655,081 A | 8/1997 | Bonnell et al. |
| 5,825,917 A | 10/1998 | Suzuki |
| 5,828,882 A * | 10/1998 | Hinckley ..................... 719/318 |
| 5,987,514 A | 11/1999 | Rangarajan |
| 6,005,979 A | 12/1999 | Chang et al. |
| 6,009,192 A | 12/1999 | Klassen et al. |
| 6,021,262 A * | 2/2000 | Cote et al. ..................... 714/48 |

(Continued)

FOREIGN PATENT DOCUMENTS

WO    WO 96/35994 A1    11/1996

OTHER PUBLICATIONS

International Search Reported for PCT/US03/01144 mailed Aug. 20, 2003.

(Continued)

*Primary Examiner*—William Thomson
*Assistant Examiner*—LeChi Truong
(74) *Attorney, Agent, or Firm*—Sprinkle IP Law Group

(57) ABSTRACT

Embodiments of the present invention provide a system and method for dynamically controlling the notification behavior of a system. One embodiment of the present invention can include a system for controlling notification behavior of a system comprising a notification program stored on a computer-readable memory. The notification program can be executable by a computer processor to determine a first notification mode based on a set of configuration parameters and a first-system state. The notification program can be further executable to determine if a notification should be sent out based a set of configuration parameters associated with first notification mode and, if a notification should be sent out, communicate the notification over a network. The notification program can also receive an updated configuration parameter associated with the first notification mode and send out a new notification based on the updated configuration parameter.

13 Claims, 3 Drawing Sheets

U.S. PATENT DOCUMENTS

| | | | | |
|---|---|---|---|---|
| 6,493,755 | B1* | 12/2002 | Hansen et al. | 709/224 |
| 6,546,432 | B2* | 4/2003 | Couturier et al. | 719/318 |
| 6,983,464 | B1* | 1/2006 | Bhattacharya et al. | 719/318 |
| 2002/0087643 | A1* | 7/2002 | Parsons et al. | 709/206 |
| 2002/0116541 | A1* | 8/2002 | Parker et al. | 719/318 |

OTHER PUBLICATIONS

Wu, et al., "Alarm Correlation Engine (ACE)" Network Operations and Management Symposium, pp. 733-742, Feb. 15-20, 1998.

International Search Report for PCT/US02/28994, Dec. 4, 2002.

Robert W. Floyd & Louis Steinberg, "*An adaptive algorithm for spatial gray scale*" SID 75 Digest: 36-37, 1975.

Paul Heckbert, "*Color image quantization for frame buffer display*" Computer Graphics, 16(3):297-307, Jul. 1982.

C. E. Shannon, "*A mathematical theory of communication*" The Bell System Technical Journal, 27(3): 379-423, Jul. 1948.

C. E. Shannon, "*A mathematical theory of communication, Part III.*" The Bell System Technical Journal, pp. 623-656, Jul. 1948.

T. A. Welch, "*A technique for high-performance data compression*" Computer, 17(6): 8-19, Jun. 1984.

Jacob Ziv, "*Coding theorems for individual sequences*" IEEE Transactions on Information Theory, 24(4): 405-412, Jul. 1978.

Jacob Ziv & Abraham Lempel, "*A universal algorithm for sequential data compression*" IEEE Transactions on Information Theory, 24(3): 337-343, May 1977.

Jacob Ziv & Abraham Lempel, "*Compression of individual sequences via variable-rate coding*"IEEE Transactions on Information Theory, 24(5): 530-536, Sep. 1978.

\* cited by examiner

SYSTEM AND METHOD FOR DYNAMICALLY DETERMINING NOTIFICATION BEHAVIOR OF A MONITORING SYSTEM IN A NETWORK ENVIRONMENT

CROSS-REFERENCE TO RELATED APPLICATIONS

This application claims priority under 35 U.S.C. § 119(e) to U.S. Provisional Patent Application No. 60/348,692, entitled "Mechanism for Dynamically Determining the Notification Behavior of a Complex System," by de Bonet et al., filed Jan. 15, 2002, U.S. Provisional Patent Application No. 60/349,424, entitled "Network Proxy Platform that Simultaneously Supports Data Transformation, Storage, and Manipulation for Multiple Protocols" by de Bonet et al., filed on Jan. 18, 2002, U.S. Provisional Patent Application No. 60/349,344 entitled "Modular Plug-In Transaction Processing Architecture" by de Bonet et al., filed Jan. 18, 2002, which are hereby fully incorporated by reference herein. Additionally, U.S. patent application Ser. No. 10/342,113, entitled "Method and System of Performing Transactions Using Shared Resources and Different Applications," by de Bonet et al., filed Jan. 14, 2003 is incorporated by reference herein.

TECHNICAL FIELD OF THE INVENTION

Embodiments of the invention relate generally to notification systems. More particularly, embodiments of the present invention relate to systems and methods for determining the notification behavior of a system.

BACKGROUND OF THE INVENTION

Over the past several decades remote monitoring of complex hardware, software and physical systems has become more commonplace. The proliferation of remote monitoring has been facilitated by the increased sophistication and speed of digital communications media. In typical remote monitoring systems, a centralized management server receives notifications regarding the status of various monitored components from software agents installed on those components. Typically, the software agents will send out status notifications at the same frequency and in the same manner regardless of the state of the monitored component. Thus, whether a component is functioning properly or exhibiting an error, the software agent associated with that component will send out notifications at the same frequency. In a large system, this can lead to an overabundance of notifications.

In order to provide a more manageable set of notifications to an operator, many prior art systems employ a network management station ("NMS") at the centralized management server that provides a common human interface for receiving the notifications and allowing the operator to select which notifications to view. The operator can configure the NMS to display only a subset of the notifications received so that the operator does not have to view every notification received by the centralized management server.

While the NMS can reduce the number notifications viewed, the notifications are still sent from the software agents. If the software agents send a large number of notifications, the notifications may require a large amount of bandwidth, saturating and slowing the network conducting the notifications. Moreover, if the operator configures the NMS to display too many notifications, he or she might be conditioned to ignore the alarms. If, on the other hand, the operator configures the NMS to filter out too many of the received notifications, he or she may never see important notifications, again missing alarm conditions.

One example of a common system displaying the inadequacies of prior art notification systems is a computer network employing simple network management protocol ("SNMP") to monitor network components. SNMP was developed in the 1980's as a simple protocol that could be implemented to manage a variety of heterogeneous systems. Originally, SNMP was intended as a stopgap measure until a more robust protocol could be developed. However, the wide adoption of SNMP made it the de facto standard for internetwork management.

SNMP generally works on a server agent architecture with agents capable of using the SNMP protocol installed on each monitored component, in some cases as a portion of the firmware. The agent can send notifications, known as SNMP traps, to advise the centralized management server when one or more conditions at the monitored component has been met. In typical SNMP systems, an SNMP trap is sent every time this set of conditions is met.

In many prior art systems, the software agent will be configured to send out an SNMP trap with the monitored component's status information regardless of whether the component is functioning properly or whether the component is malfunctioning. This can lead to the software agent communicating a large volume of SNMP traps to the centralized management server. The operator, through an NMS, will then determine which SNMP traps to view. If the operator chooses to view a large number of the SNMP traps, he or she may miss alarm conditions due to information overload. Conversely, if the operator sets the NMS to filer too many SNMP traps, the operator may never see an SNMP trap indicating an alarm at a monitored component.

To reduce the number of SNMP traps sent, some prior art systems define several levels for notification behavior. Examples of such levels include a level in which all alarm messages, but no other notifications, are sent by the software agents, a level in which all SNMP traps are sent by the software agents, or a midlevel in which both SNMP traps indicating normal operation and alarm conditions are sent by the software agent according to some predefined rule. However, these systems only provide a course control that is typically applied to all the software agents (or SNMP traps of those agents). They do not allow fine control for tuning a particular SNMP trap to send out notifications at, for example, different frequencies or for adjusting the behavior of the particular SNMP trap depending on the status of the component being monitored by the SNMP trap.

SUMMARY OF THE INVENTION

Embodiments of the present invention provide a system and method for determining notification behavior of a system that substantially reduces or eliminates the disadvantages associated with previously-developed notification systems and methods. More particularly, embodiments of the present invention provide a system and method for dynamically controlling the notification behavior of a system. One embodiment of the present invention can include a system for controlling notification behavior of a system comprising a notification program stored on a computer-readable memory. The notification program can be executable by a computer processor to determine a first notification mode based on a set of configuration parameters and a first system state. The notification program can be further executable to determine if a notification should be sent out based a set of configuration parameters associated with first notification mode and, if a notification should be sent out, communicate the notification over a network. The notification program can also receive an updated configuration parameter associated with the first notification mode and send out a new notification based on the updated configuration parameter.

In one embodiment of the present invention, the notification program can determine if a notification should be sent out under the first notification mode based on the time the last notification associated with the first notification mode was sent out and a frequency parameter for the notification mode.

In another embodiment of the present invention, the notification program can determine if a notification should be sent out under a notification mode based on the number of previous consecutive notifications that have been sent out for that notification mode.

Another embodiment of the present invention can include a method for controlling the notification behavior of a system, including the steps of: (i) determining a first notification mode based on a set of configuration parameters and a first system state; (ii) determining if a notification should be sent out based on the set of configuration parameters and the first notification mode; and (iii) if so, communicating a notification over a network. This embodiment of the present can further comprise: (iv) receiving an updated configuration parameter associated with the first notification mode; (v) determining a new notification mode based on a new system state and the set of configuration parameters; and (vi) if the new notification mode is determined to be the first notification mode, determining if a new notification should be sent out based on the updated set of configuration parameters; and (vii) sending out a new notification.

In one embodiment of the present invention, the step of determining if a notification should be sent out based on a set of configuration parameters and the first notification mode can be based on the time the last notification associated with the first notification mode was sent out and a frequency parameter.

In another embodiment of the present invention, the step of determining if a notification should be sent out under a notification mode can be based on the number of previous consecutive notifications that have been sent under that notification mode.

Embodiments of the present invention provide advantages over prior art notification systems by allowing the notification characteristics of multiple notification modes to be defined. This allows an operator to tune the notification characteristics of embodiments of the present invention to prevent information overload while ensuring that sufficient alarm notifications are received.

Embodiments of the present invention provide another advantage over prior art systems and methods of determining notification behavior by allowing configuration parameters associated with various notification modes to be dynamically changed during execution of the remote agent thereby allowing the notification behavior of the system to be dynamically turned.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the present invention are illustrated in the figures, like numerals being used to refer to like and corresponding parts of the various drawings. Embodiments of the present invention provide a system and method to manage the notification behavior of a system. One embodiment of the present invention can define multiple notification modes, each exhibiting different notification behavior, based on the state of a component being monitored. For example, embodiments of the present invention can define notification modes such that notifications that indicate a problem state in a monitored component can be sent out more frequently than notifications that indicate that the monitored component is functioning properly. A number of notification modes can be defined to provide various gradations of notification behavior depending on the state of the monitored component. Moreover, the manner in which a particular notification is sent out can also be controlled. Thus, for example, important notifications can be sent to an operator's pager whereas less important notifications can be sent in some other manner (e.g. email).

Figure 1:
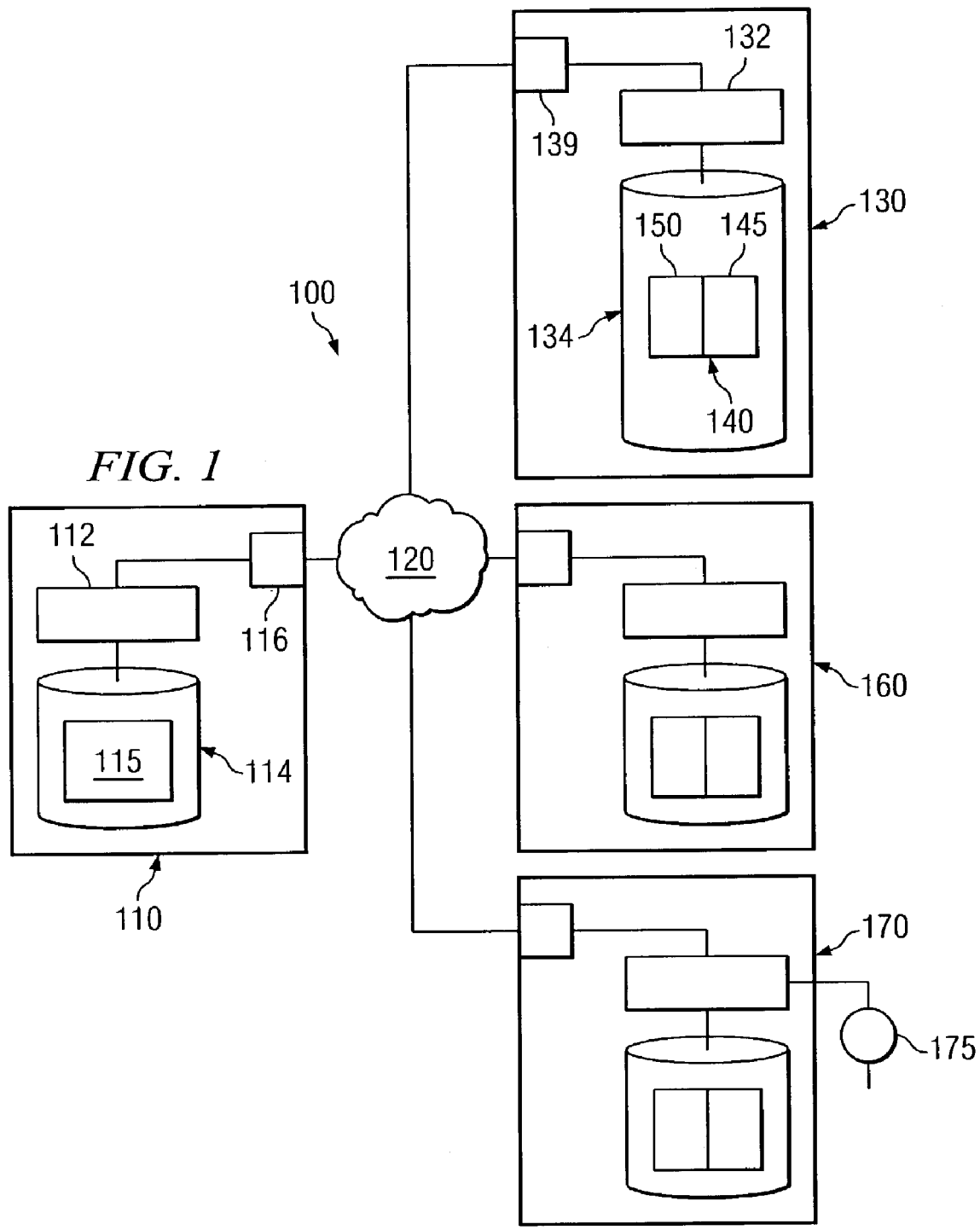
FIG. 1 is a diagrammatic representation of a system according to one embodiment of the present invention.

FIG. 1, is a diagrammatical representation of a system 100 in which one embodiment of the present invention can be implemented. System 100 can comprise a management system 110 that can include a management computer processor 112, a management computer readable memory 114 (e.g. RAM, ROM, magnetic storage device, optical storage device, and/or any other computer readable memory known in the art) and a management system network adaptor 116 (e.g. modem, Ethernet card or any other network communication device known in the art). Management System 110 can further include a management program 115 stored on computer-readable memory 114 that is executable by management processor 112. Management program 115 can receive and process multiple notifications from various software agents over network 120. Moreover, management program 115 can include an NMS to allow an operator to limit the number of notifications he or she views. Although shown as a single physical unit in FIG. 1, it should be noted that the functionality of management System 110 can be distributed.

In addition to management system 110, system 100 can include multiple monitoring systems (e.g. monitoring system 130, monitoring system 160 and monitoring system 170). Although only shown for monitoring System 130, each monitoring system can include a computer processor 132 and a computer-readable memory 134 (e.g. RAM, ROM, magnetic storage device, optical storage device, and/or any other computer readable memory known in the art). Moreover, each monitoring system can include a network adaptor device 139 (e.g. Ethernet Card Modem or any other network communications device known in the art). A notification program 140 can reside at computer-readable memory 134. In the embodiment shown in FIG. 1, notification program 140 can contain a monitoring portion 145 and a notification portion 150. Monitoring portion 145 can receive data regarding the state of a monitored component, and based on this data, notification portion 140 can send notifications to management system 110 via network 120. In another embodiment, notification program 140 can be separate from the program that determines the system state or can be implemented in any other suitable manner as would be understood by one of ordinary skill in the art (e.g. as a software component of larger software package, a function larger software package, a separate program, a portion of another program).

The monitored components can include components of the monitoring system, such as hardware or software components, or may include external components. For example, in the system of FIG. 1, notification program 140 of monitoring system 130 can determine the system state of one or components of monitoring system 130. In fact, notification program 140 can be implemented, in one embodiment of the present invention, as firmware on the monitored component (e.g. firmware on a hard drive). As another example, notification program 140 of monitoring system 170 can receive data from pressure gauge 175 to determine the system state of a pressure chamber. Other examples of monitored components can include hardware components, such as hard drives, memory, network adapters or any other hardware, software or mechanical system capable of being automatically monitored by a program.

In operation, notification program 140 can determine the system state for a component being monitored. For example, notification program 140 of monitoring system 170 can, through monitoring portion 145, can determine the pressure of a chamber through pressure gauge 175. Similarly, monitoring portion 145 in monitoring system 130 can determine, for example, the saturation of RAM in monitoring system 130 (i.e. can determine the amount of memory being used). Based on this state information, notification program 140 can determine a notification mode that corresponds to the system state. Each notification mode can define the notification behavior for a particular system state.

For example, monitoring system 170 can define a first notification mode for a pressure between zero and 1,000 psi (e.g. a low-pressure mode), a second notification mode for a pressure from 1,000 psi to 9,000 psi (e.g. a normal-pressure mode), and a third notification mode for a pressure from 9,000 psi to 10,000 psi (e.g. a high-pressure mode). Each notification mode can define how frequently and how many times a notification for a particular system state is sent out.

Continuing with the previous example, the first notification mode (the low-pressure notification mode), corresponding to a pressure of less than 1,000 psi, can be configured to send out notifications every five minutes for a maximum of six consecutive notifications. The second notification mode (the normal-pressure notification mode), corresponding to a pressure of 1,000 to 9,000 psi, can be configured to send out notifications every two minutes for a maximum of 8 consecutive notifications, and the third notification mode (the high-pressure notification mode), corresponding to a pressure of greater than 9,000 psi, can be configured to send out notifications every 10 seconds without limit.

If the notification mode changes because the system state changes (e.g. the pressure goes from 800 psi to 3000 psi), a new notification can be sent out based on the new notification mode. As an example, if, at minute five, notification program 140 sends out a notification based on the first notification mode, and, at minute six, notification program 140 of system 170 determines that the pressure has changed to 3,000 psi, the notification program 140 can send out a new notification in accordance with the second notification mode. If at minute seven the pressure changes back to the below 1,000 psi, corresponding to the first notification mode, notification program 140 can send out a new notification in accordance with the first notification mode. Alternatively, because five minutes (i.e. the frequency of the first notification mode) have not passed since the last notification under the first notification mode was sent out, system 170 may delay sending out the new notification until the five minutes pass.

Notification program 140 can send out notifications in a variety of manners including email, pager, fax or SNMP trap and embodiments of notification program 140 can send notifications associated with different notification modes in different formats. For example, notifications program 140 could send high-priority notifications to an operator's pager, but send lower priority notifications to the operator's email address.

In one embodiment of the present invention, management program 115 can send updated configuration parameters to the monitoring systems thereby dynamically altering the notification behavior of a monitored system. For example, rather than having a frequency of every five minutes for the first notification mode of monitoring system 170, management program 115 can change the frequency parameter for the first notification mode to 3 minutes. This can be done while notification program 140 is running, resulting in a dynamic update to the notification behavior of monitoring system 170.

Figure 2A:
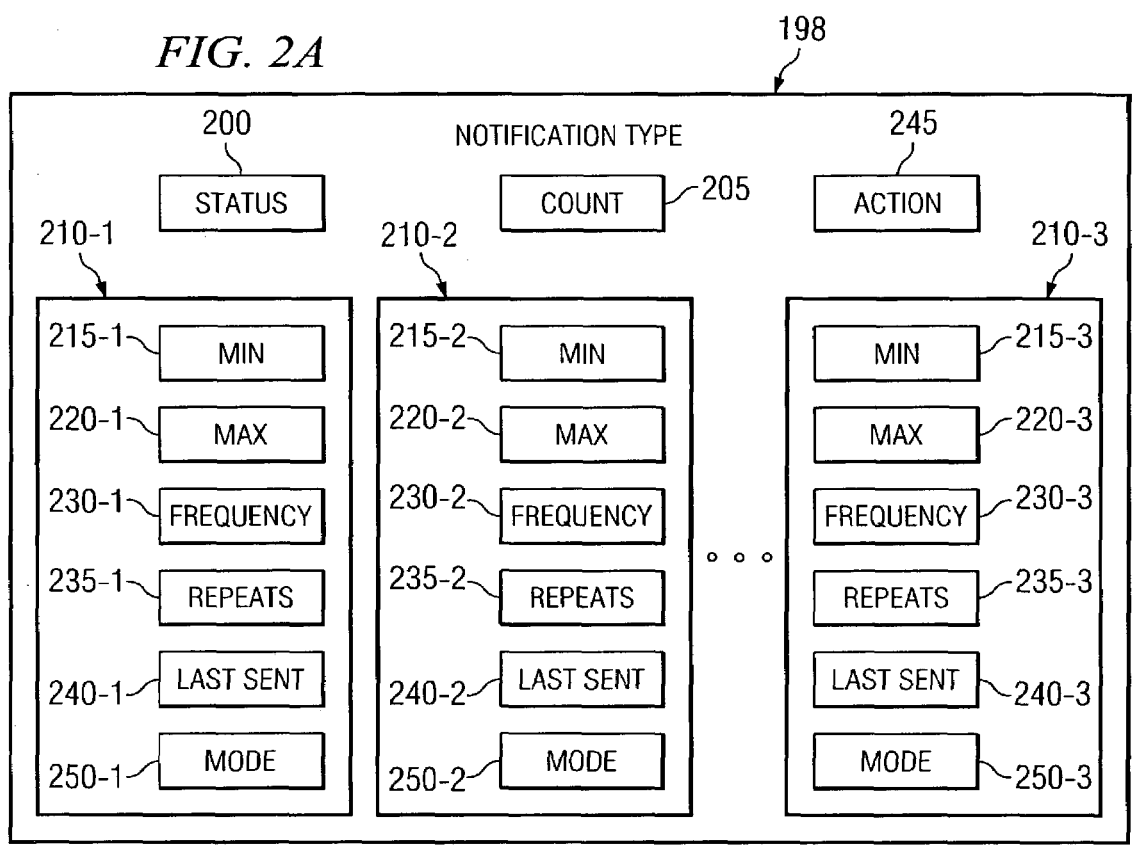
FIG. 2 is a diagrammatic representation of a set of configuration parameters defining multiple notification modes according to one embodiment of the present invention.

FIG. 2A is a diagrammatic representation of a notification type 198 with configuration parameters that can be used by notification program 140 to determine if a notification should be sent according to the state of a monitored component. Each notification program 140 can utilize several notification types, with notification modes defined for each notification type. The notification type can represent the function for sending out a notification for a particular type of system state. For example, monitoring system 170 could have two notification types, one for notifications regarding pressure and one for notifications regarding temperature, with each notification type having several notification modes. As another example, each notification type can represent different types of SNMP traps implemented at the same monitored component(s).

The configuration parameters for each notification type can include a status parameter 200 and a count parameter 205. The status parameter indicates the notification mode (e.g. notification mode 210-1, notification mode 210-1 or notification mode 210-3) that is associated with the current state of the component being monitored for notification type 198. The appropriate notification mode for a system state can be determined from one or more threshold parameters. In the embodiment of FIG. 2A, each notification mode is associated with a "min" parameter 215 and a "max" parameter 220. Other threshold parameters can be used and in some cases the notification modes may only be associated with a single threshold parameter, rather than multiple threshold parameters as shown in FIG. 2A.

Each notification mode can further be associated with a frequency parameter 230, a repeats parameter 235 and a last-sent parameter 240. The frequency parameter can determine how much time must lapse between notifications sent for a particular mode. Thus, for example, frequency parameter 230-1 will indicate the frequency at which notifications according to notification mode 210-1 can be sent. The last sent parameter 240 can indicate the time that a notification was last sent for the respective notification mode and the repeats parameter 235 can indicate the number of consecutive times that a notification according to the associated notification mode can be sent. For each notification type, a count parameter 205 can keep track of how many consecutive times a notification according to the current notification mode (indicated by status parameter 200) has been sent.

Figure 2B:
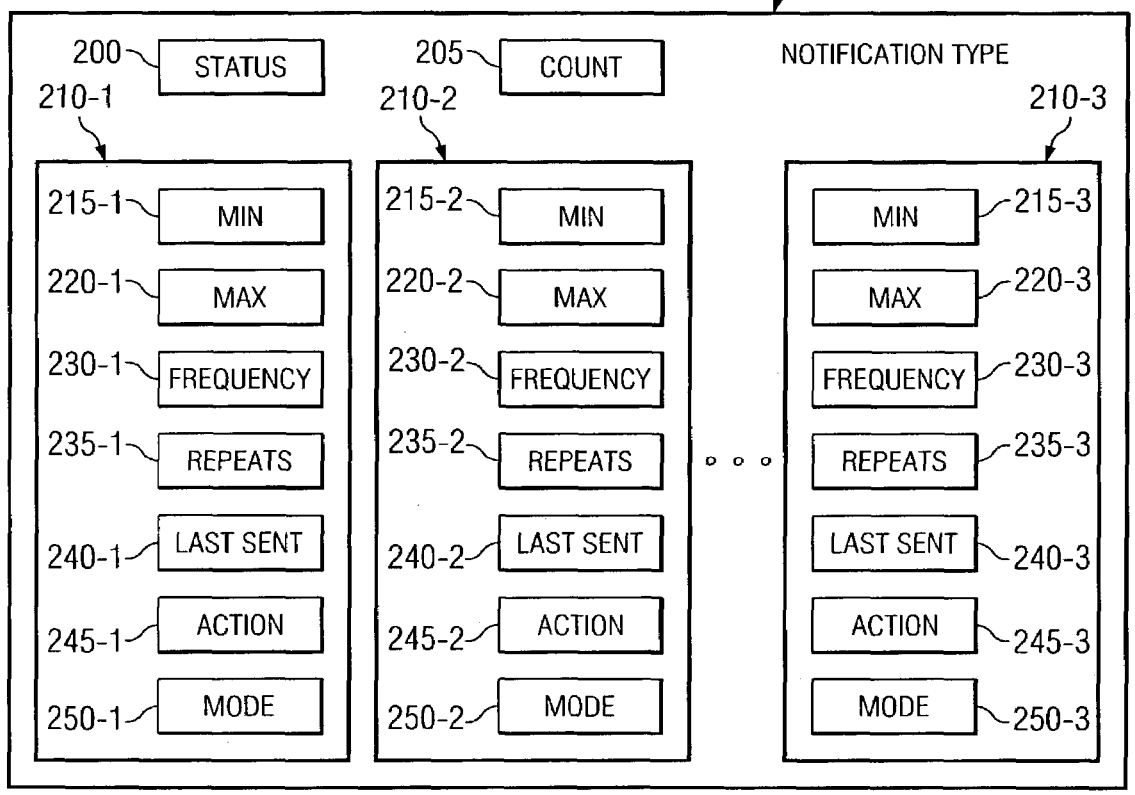

In addition, the configuration parameters can include an action parameter 245 that indicates the type of notification to be sent (e.g. SNMP trap, email, page, dialog box, telephone call, fax print out, SMS chat or other notification mechanism known in the art). In the embodiment of FIG. 2A, each notification for a notification type 198 is sent using the same notification method as determined by action parameter 245. In the embodiment of FIG. 2B, on the other hand, each notification mode can be associated with a different notification action.

Assuming, for the sake of explanation, that a particular notification program 140 monitors the amount of RAM being used by a network component, notification program 140 can define a notification type associated with monitoring RAM saturation and further defining multiple notification modes, including a light-usage mode 210-1, a medium-usage mode 210-2, and a heavy-usage mode 210-3. The names of the modes can be stored in the respective mode parameter 250. In this example, light-usage mode can have a min parameter equal or greater than to 0% and a max parameter equal to or less than 20%, medium-usage mode 210-2 can have a min parameter 215-2 greater than 20% and a max parameter 220-2 equal to or less than 70% and the heavy usage mode 210-3 can have a min parameter 215-3 of 70% and a max parameter 220-3 of 100%. Thus, depending on the percentage of RAM used by the network component, the different notification modes will govern the notification behavior of notification program 140.

In operation, notification program 140 can determine the status of the component being monitored by comparing the performance data of the monitored component to the threshold parameter or parameters for the notification modes. For example, if the performance measurements indicate that 15% of the RAM of the monitored component is being used, this is within the threshold parameters 215-1 and 220-1 of light-usage mode 210-1. Therefore, notification program 140 can determine that the system state corresponds to light-usage mode 210-1 and set the status parameter 200 equal to the mode parameter 250-1. Additionally, if the status has changed since the last measurement was taken, notification program 140 can reset count parameter 205 to zero.

Assuming, for the sake of example, that the notification mode has remained the same between measurements of the system's state (i.e. the previously determined system state and the current system state correspond to the same notification mode), notification program 140 can determine if a notification should be sent out under the current notification mode (e.g. light-usage mode 210-1), based on frequency parameter 230-1 and last-sent parameter 240-1. If, for example, the frequency parameter 230-1 of light-usage mode 210-1 is set to 10 seconds and the time at which the last notification under parameter 240-1, was greater than 10 seconds ago, notification program 140 can, in one embodiment of the present invention send out a notification. In another embodiment of the present invention, notification program 140 can further determine if the number of notifications sent out under notification mode 210-1 (e.g. as indicated by count parameter 205), exceeds the number of allowed repeats indicated by repeats parameter 235-1. If the number of notifications does not exceed the allowed number of repeats, notification program 140 can send out a notification and increment the value of count parameter 205.

In the foregoing example, the notification program 140 determined that the notification mode did not change. If however, notification program 140 determines that the notification mode changes since the last system measurement (e.g. goes from light-usage mode 210-1 to medium-usage mode 210-2), notification program 140 can reset count parameter 205 to zero. In one embodiment notification program 140 can then send out a notification under medium-usage mode 210-2. Alternatively, notification program 140 can determine if enough time has passed since the last notification has been sent out under medium-usage mode 210-2 to send out a new notification under medium-usage mode 210-2 by, for example, comparing the difference between the current time and the value of last sent parameter 240-2 to frequency parameter 230-2. If enough time has passed, notification program 240 can send out a new notification under medium-usage mode 210-2.

In one embodiment of the present invention, the notification modes can be updated by management program 115. In this embodiment, management program 115 can push out new configuration parameters to notification program 140. For example, if an operator wishes to receive a light-usage RAM notification more often, management program 115 can communicate a new frequency parameter 230-1 to notification program 140. Frequency parameter 230-1 can be updated during execution. When notification program 140 next determines the notification should be sent out under light-usage mode 210-1, notification program 140 can base this decision on the new or updated frequency parameter 230-1. In other cases, management program 115 can communicate multiple new configuration parameters to notification program 140 and can define new notification modes for a notification type. Thus, in addition to controlling the notification behavior of a system based on the system state, one embodiment of the present invention can allow for dynamic updates to the notification behavior.

It should be noted that while in FIG. 2A and FIG. 2B the set of configuration parameters associated with each notification mode are shown together, they can be stored in different locations or accessed at different times during the execution of notification program 140. Moreover, each notification program 140 may define several notification types. For example, if notification program 140 monitors both CPU usage and memory usage, the notification program may define a RAM usage notification function and a CPU usage notification function, each defining their own notification modes. Based on the system state of the monitored component, notification program 140 can call the various notification types to send notifications regarding the RAM usage and the CPU usage. This allows notifications regarding different aspects of the same or different monitored component to be sent separately.

Moreover, in the embodiments of FIG. 2A and FIG. 2B, multiple notification modes are defined for notification type 198. However, in one embodiment of the present invention, a single notification mode may be defined for notification type 198. In this case, the notification mode can act as a "heartbeat" notification that can be sent according to frequency parameter 230. The notification can be, for example, a "System Okay" notification. If management program 115 does not receive this heartbeat notification, this can indicate that the system state of the monitored component no longer corresponds to a "system okay" notification mode, indicating a problem with the component, or it can indicate a problem with notification program 140, the network connection or other communications issue. The frequency of the heartbeat notification can be adjustable through frequency parameter 230. Additionally, the form of notification sent (e.g. SNMP trap, email, fax, etc.) can also be controlled through an action parameter 245 associated with notification type 198 or the notification mode.

Figure 3:
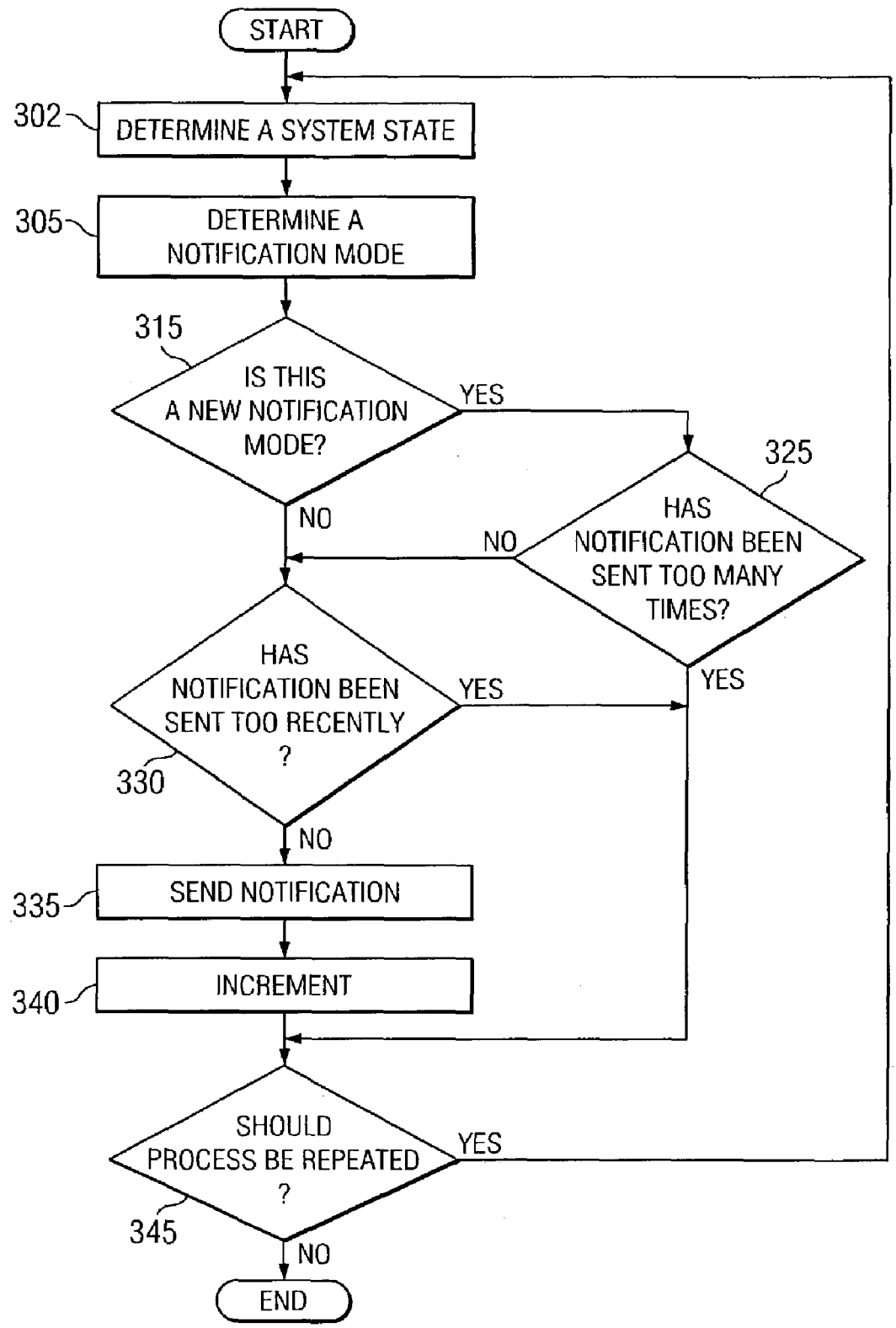
FIG. 3 illustrates a flow chart for a method of controlling notification behavior according to one embodiment of the present invention.

FIG. 3 illustrates a flow chart for controlling the notification behavior of a system according to one embodiment of the present invention. At step 302, notification program 140 can perform the tasks necessary to determine a system state such as monitoring a component for various performance parameters such as CPU usage, RAM usage, ASP queuing and other performance parameters known in the art (e.g. via monitoring portion 145) or receiving a system state or system state data from another program. At step 305, notification program 140 can determine a notification mode based on the system state and, for example, a set of configuration parameters. Continuing with the previous example, the system state may indicate that 15% of the RAM is being used, indicating a light-usage mode for the notification type corresponding to RAM monitoring.

Notification program 140, at step 315, can then determine if the notification mode is the same as the previous notification mode or if a new notification mode has been entered. Notification program 140 can also check to ensure that a notification for the notification mode has not been sent too many times (step 325). In one embodiment of the present invention, this can be done by comparing count parameter 205 for the notification type to the repeats parameter for a particular notification mode. If, for example, the notification mode is the light-usage mode, repeats parameter 235-1 can be compared to count parameter 205. If the value of counts parameter 205 is equal to that of repeats parameter 235-1, in one embodiment of the present invention, notification program 140 will not send out a notification and control can pass to step 345. If, however, the value of counts parameter 205 is less than repeats parameter 235-1, control can pass to step 330.

At step 330, notification program 140 can check if a notification under the notification mode has been sent out too recently to repeat by, for example, comparing the difference in the current time and the value of the last-sent parameter 240 for the notification mode to the frequency parameter 230 for the notification mode. Again using the previous example, notification program 140 can subtract the value of the last-sent parameter 240-1 from the current time and compare this to the value of frequency parameter 230-1. If the last notification under the light-usage mode was not sent out too recently, as determined at step 330, notification program 140, at step 335, can send a notification according to action parameter 245.

In one embodiment of the present invention, step 330 can occur even if a new notification mode was entered as determined at step 315. Therefore, notification program 140, in one embodiment of the present invention, may not immediately send out a notification even if notification program 140 determines that the system state corresponds to a new notification mode. At step 340, notification program 140 can increment the count parameter 205 for the notification type and update the last-sent parameter for the notification mode if a notification is sent out. Notification program 140 can optionally repeat the process of FIG. 3 (step 345).

Table 1 includes an example of pseudo-code for implementing one embodiment of the process of FIG. 3. The code of table 1 is provided by way of example only and is not limiting of the present invention. Notification program 140 can be implemented using any suitable programming language and structure, as would be understood by those of ordinary skill in the art.

TABLE 1

```
function main_loop( . . . ) {
        while( program_running ) {
                // monitor system
                . . .
                // determine the system state
                system_state = CheckSystem( );
                // potentially send an notification
                reporting the system state
                NotificationFunction("SYSTEM-STATE",
                system_state);
        }
}
function NotificationFunction
(notification_type, mode) {
        // if we've entered a new mode then
        the count is no longer relevant
        if (GetVariable(notfication_type +
        "::STATUS") != mode) {
                SetVariable(notification_type +
                "::COUNT", 0);
        }
        // keep track of the latest mode
        SetVariable(notification_type +
        "::STATUS", mode);
        // check if the notification hasn't
        been repeated too many times
        if (GetVariable(notification type +
        "::COUNT") <
    GetVariable(notification_type+mode +
    "::REPEATS")) {
                // check if the notification was reported too recently
                if (
                        (Date() - GetVariable(notification_type+mode +
                        "::LASTSENT"))
                        > GetVariable(notification_type+mode +
                        "::FREQUENCY")
                ) {
                        // actually send the notification
                                DoNotification(GetVariable-
                                (notification_type + "::ACTION"),
    notification, mode);
                        // do some bookkeeping
                        IncrementVariable(notification_type +
                        "::COUNT");
                        SetVariable(notification_type+mode +
                        "::LASTSENT", Date());
                }
        }
}
```

In this embodiment of the present invention, a notification type can be called as a function of a main program that is capable of calling one or more notification types. With reference to FIG. 3, notification program 140, at step 302, can perform the tasks necessary to determine a system state, such as monitoring a component for various performance parameters such as CPU usage, RAM usage, ASP queuing and other performance parameters known in the art (e.g. via monitoring portion 145) or receiving a system state or system state data from another program. At step 305, notification program 140 can determine a notification mode for a system state. For example, the system state may indicate that 15% of the RAM is being used. The "system_state" variable, at step 305, can be set equal to a particular notification mode based on the threshold parameters for each notification mode of an underlying notification type (e.g. the system_state variable can be set equal to light-usage if the RAM usage is 15%).

Notification program 140 can call a notification function using the value of the system_state variable as input to that notification function. If notification program 140 defines a notification type as "SYSTEM-STATE" to send notifications regarding RAM usage, notification program 140 can call a notification function using the SYSTEM-STATE as an input for the notification type and the system_state variable as the input for the notification mode.

As step 315, notification program 140 can determine if a new mode has been entered by comparing the status parameter 200 to the input mode value (i.e. to the value of the system_state variable). If a new mode has been entered, then notification program 140 can set the count parameter 205 for the "SYSTEM-STATE" notification type to zero. Notification program 140 can then set the status parameter 200 for the "SYSTEM-STATE" notification type to the value of the mode variable, (e.g. the value of the system_state variable). It should be noted that other notification types can be called (e.g. "SYSTEM-STATE2") depending on the performance characteristics being monitored.

Notification program 140 can also check to ensure that a notification for the notification mode has not been sent too many times(step 325). In one embodiment of the present invention, this can be done by comparing count parameter 205 for the notification type to the repeats parameter for a particular notification mode. For example, if the notification mode is the light-usage mode, as determined by the system_state variable, repeats parameter 235-1 can be compared to count parameter 205. If the value of counts parameter 205 is equal to that of repeats parameter 235-1, notification program 140 will not send out a notification. If, however, the value of counts parameter 205 is less than repeats parameter 235-1, control can pass to step 330.

At step 330, notification program 140 can check if a notification under the notification mode has been sent out too recently to repeat by, for example, comparing the difference in the current time and the value of the last-sent parameter 240 for the notification mode to the frequency parameter 230 for the notification mode. Again using the previous example, notification program 140 can subtract the value of the last-sent parameter 240-1 from the current time and compare this to the value of frequency parameter 230-1. If the last notification under the light-usage mode not been sent out too recently, as determined at step 330, notification program 140, at step 335, can send a notification according to action parameter 245. At step 340, notification program 140 can increment the count parameter 205 for the notification type and update the last-sent parameter for the notification mode. If however, a notification is not sent at step 335, notification program 140 can exit the "SYSTEM-STATE" notification type and return to the main loop.

As another example of one embodiment of the present invention in operation, assume the notification type called "SYSTEM-STATE2" has three notification modes: OKAY, THROTTLE and ERROR. The configuration parameters that define the behavior of the SYSTEM-STATE2 notification type can be as follows:

SYSTEM-STATE2::STATUS
SYSTEM-STATE2::COUNT
SYSTEM-STATE2::ACTION=SNMPTRAP
SYSTEM-STATE2::OKAY::FREQUENCY=0
SYSTEM-STATE2::OKAY::REPEATS=1
SYSTEM-STATE2::OKAY::LAST SENT
SYSTEM-STATE2::THROTTLE::FREQUENCY=30
SYSTEM-STATE2::THROTTLE::REPEATS=1
SYSTEM-STATE2::THROTTLE::LAST SENT
SYSTEM-STATE2::ERROR::FREQUENCY=0
SYSTEM-STATE2::ERROR::REPEATS:=INFINITE
SYSTEM-STATE2::ERROR::LAST SENT

When the notification mode "SYSTEM-STATE2::OKAY" is called, an SNMP trap is sent once per status change (i.e. "SYSTEM-STATE2::OKAY::REPEATS"=1) without restriction on how often it will be sent (i.e. "SYSTEM-STATE2::OKAY::FREQUENCY"=0). When "SYSTEM-STATE2::THROTTLE" is called, an SNMP trap will be sent at a maximum rate of once every 30 seconds. The trap will only be sent once per status change. If "SYSTEM-STATE2::ERROR" is called, an SNMP trap is sent as often and as rapidly as they are triggered because frequency equals zero and repeats equals infinite. In one embodiment of the present invention, notifications under the ERROR mode can represent the highest priority notifications for the SYSTEM-STATE2 notification type as they are the least restricted.

Table 2 provides an example timeline for the "SYSTEM-STATE2" notification modes.

TABLE 2

| TIME | SYSTEM-STATE2::STATUS | Notification Sent |
|---|---|---|
| 0 | OK | YES |
| 1 | THROTTLE | YES |
| 2 | OK | YES |
| 3 | ERROR | YES |
| 4 | THROTTLE | NO (FREQ = 30) |
| 5 | OK | YES |
| 6 | OK | NO (REPEAT = 1) |
| . | . | . |
| . | . | . |
| . | . | . |
| 28 | ERROR | YES |
| 29 | ERROR | YES |
| 30 | ERROR | YES (No FREQ. or Repeats Limits) |
| 31 | OK | YES |
| 32 | THROTTLE | YES (30 seconds has passed since last TRHOTTLE sent out at t = 1) |
| 33 | THROTTLE | NO (30 seconds has not passed since last THROTTLE) |
| 34 | OK | YES |
| 35 | OK | NO (Repeats = 1) |

In the example of Table 2, notification program 140 can determine the notification mode to which system state corresponds every second beginning at zero seconds. Using the psuedocode of Table 1 and substituting SYSTEM-STATE2 for SYSTEM-STATE, notification program 140 can set variable system_state equal to OKAY (step 305).

Notification program 140 can then call the "SYSTEM-STATE2" notification type using OKAY as the notification mode. Since this is the first notification of this notification type, the count parameter 205 can be reset to zero and the notification can be sent out (step 335). At t=1, notification program 140 can determine that the system state corresponds to the notification mode THROTTLE (step 305), call the "SYSTEM-STATE2" notification type, determine that a new mode has been entered, reset the count parameter 205 and send out a notification (step 335) as no previous notification of this type has been sent out.

At t=2, notification program 140 can determine that the system state corresponds to the notification mode OKAY (step 305) and call the notification function using the notification type SYSTEM-STATE2 with OKAY as the notification mode. At step 315, since this is a new notification mode compared to the last measurement, notification program 140 can reset the count parameter 205 to zero and update the status parameter 200 to reflect the OKAY mode. Because the frequency parameter corresponding to the OKAY mode is set to zero, and the number of repeats is set to 1, monitoring system 140 can send out a notification (step 335) indicating a system state of OKAY.

Skipping now to t=4, monitoring system 140 can determine that the system state corresponds to a notification mode of THROTTLE (step 305). At step 315, notification program 140 can determine that this is a new notification mode as the previous notification mode indicated by status parameter 200 being equal to ERROR (from t=3). Notification program 140 can reset the count parameter 205 to zero and set the status parameter 200 to THROTTLE. Notification program 140, at step 325, can check if the notification under the THROTTLE notification mode has been repeated too many times. However, in this case the count is equal to zero as this is an new notification mode. At step 330, notification program 140 can determine if the last notification sent under the THROTTLE notification mode has been sent too recently. In this case, the current time, which is equal to 4 seconds, minus the value of the last-sent parameter 240 (i.e. 1 second) is less than the value of the frequency parameter 230, which is set at 30 seconds. Therefore, no notification will be sent out under the THROTTLE notification mode at t=4. Since no notification was sent, notification program 140 will not increment count parameter 205 or change last-sent parameter 240.

As illustrated in Table 2, the notification mode does not change between t=5 and t=6. The system state at both of these times corresponds to a notification mode of OKAY. At t=5, a notification will be sent out because there are no restrictions on the frequency of notifications sent under the OKAY mode and this is a new notification mode. Once the notification is sent under the OKAY notification mode, notification program 140 can then increment count parameter 205. At t=6, however, the notification will not be sent out because a new notification mode has not been entered and the repeats parameter 235 is set to 1. In other words, notification program 140 will determine that the value of count parameter 205, having been incremented at t=5, is not less than the value of repeats parameter 235 (step 325) for the OKAY mode.

At times t=28-30, monitoring system 140 can determine that the system state corresponds to a notification mode of ERROR. In each of these cases, an error notification can be sent out as there are no limits on the frequency or number of consecutive notifications that can be sent out under the ERROR mode.

At the time t=32, notification program 140 can determine that the system state corresponds to a notification mode of THROTTLE (step 305) and call the "SYSTEM-STATE2" notification type using THROTTLE as the mode. Notification program 140 can then determine that this is a new notification mode compared to the previous notification mode, reset count parameter 205 to zero and status parameter 200 to THROTTLE. Since count parameter is equal to zero, the value of repeats parameter 235 does not restrict the sending of a notification. Moreover, since the last notification under the Throttle notification mode was sent at the time t=1, the frequency parameter 230, which was set to 30 seconds, will not restrict the sending of a notification. Therefore, at step 335, notification program 140 can send a notification according to the THROTTLE notification mode. Additionally, notification program 140 can increment count parameter 205 and set the last-sent parameter to 32, starting a new 30 second period.

It should be noted that, in the embodiment of Table 2, since the action parameter 210 was set to SNMP trap, each of the notifications generated will be sent as an SNMP trap. In other embodiments of the present invention, the notifications can be sent in other formats such as email, pager, fax, telephone, chat session, dialogue box or other notification method known in the art.

In addition to determining if a notification should be sent out based on a set of notification modes, embodiments of notification program 140 can receive dynamic updates to the notification modes. Management program 115 can determine if the configuration parameters for the notification program 140 need to be updated. This can occur even if no notification was sent out at step 335 because, for example, the number of previous notifications met or exceeded the repeat parameter as determined at step 320, or the last notification corresponding to the current notification mode was sent out too recently as determined at step 325. If management program 115 determines that updated configuration parameters should be sent to notification program 140, management program 115 can send out one or more update configuration parameters. Updates, in one embodiment of the present invention, can be performed via SNMP. In another embodiment of the present invention, notification program 140 can present an interface through which configuration parameters can be adjusted. At step 345, one embodiment of the present invention can repeat steps 305-345 using the updated configuration parameters.

In summary, notification program 140 can determine a notification mode based on the system state of a component being monitored and a set of configuration parameters. Notification program 140 can then determine if a notification should be sent out based the number of previous consecutive notifications that correspond to the same notification mode and/or the time at which the last notification under the current notification mode was sent out and a frequency parameter. Because both the repeats parameter and frequency parameter can be updated, the number of consecutive notifications corresponding to a particular notification mode and how often those notifications are sent can be dynamically adjusted by an operator.

Embodiments of the present invention provide an advantage over prior art systems by allowing the operator to configure notification program 140 to send out notifications of different priorities with different frequencies. This can reduce information overloading and bandwidth requirements as the overall number of notifications can be reduced, while priority notifications can still be sent out frequently. Moreover, the notification behavior of a notification program can be dynamically tuned without requiring the notification program to be reinstalled.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for dynamically controlling notification behavior, comprising:
a network;
a monitoring system further comprising:
a monitoring system computer processor;
a monitoring system network interface device electrically connected to the monitoring system computer processor to communicate data to the network;
a monitoring system computer readable memory containing a notification program executable by the monitoring system computer processor to:
load a set of configuration parameters;
determine if a first notification should be sent based on said set of configuration parameters and a system state of one or more components being monitored by said monitoring system;
if the first notification should be sent, communicate said first notification over said network;
receive an update to at least one configuration parameter of the set of configuration parameters during execution; and
send out at an additional notification based on the update to the at least one configuration parameter, resulting in a change in the notification behavior of the monitoring system during execution thereof; and
a management system further comprising:
a management system computer processor;
a management system network interface device electrically connected to the management system computer processor to communicate data to the network;
a management system computer readable memory containing a management program executable by the management system computer processor to:
receive the first notification from the monitoring system over the network; and
communicate one or more new or updated configuration parameters to the monitoring system for automatically dynamically updating the notification behavior of the monitoring system over the network.

2. The system of claim 1, wherein said set of configuration parameters defines at least two notification modes for a notification type.

3. The system of claim 2, wherein for each notification mode, said set of configuration parameters further comprises:
a frequency parameter defining a frequency of sending notifications; and
a repeats parameter defining a number of times of sending consecutive notifications.

4. The system of claim 3, wherein for each notification mode, said set of configuration parameters further comprises a last sent parameter defining the time a notification for the associated notification mode was last sent out.

5. The system of claim 4, wherein for each notification mode, said set of configuration parameters further comprises at least one threshold parameter.

6. The system of claim 4, wherein said set of configuration parameters further comprises an action parameter defining an action to be taken when a notification is sent out.

7. The system of claim 6, wherein said monitoring software is further executable to send out said first notification as an SNMP trap based on said action parameter.

8. The system of claim 2, wherein said set of configuration parameters further comprises a status parameter defining the notification mode under which the first notification is sent out.

9. The system of claim 8, wherein said set of configuration parameters further comprises a count parameter indicating the number of consecutive notifications sent out under at least one notification mode of said at least two notification modes.

10. The system of claim 2, wherein the notification program is further executable to determine if the first notification should be sent based on the time a previous notification was sent out under the first notification mode and a frequency parameter associated with the first notification mode.

11. The system of claim 10, wherein said updated configuration parameter is an updated frequency parameter associated with said first notification mode.

12. The system of claim 11, wherein the notification program is further executable to determine if the additional notification should be sent based on the time the first notification was sent out and the updated frequency parameter.

13. The system of claim 1 wherein the notification program is further executable to determine if the first notification should be sent out based on the set of configuration parameters and the first notification mode by:
determining if a number of consecutive notifications associated with the first notification mode exceeds a preset value.

* * * * *